2,839,543

PROCESS FOR PREPARING CYANIDES OF TRIARYLMETHANE DYES

Lyman Chalkley, Washington, D. C.

No Drawing. Application December 2, 1955
Serial No. 550,774

13 Claims. (Cl. 260—394)

The present invention relates to a process for the preparation of colorless cyanides of triarylmethane dyes and, more particularly, to such a process in which the dye is reacted in solution with a soluble, ionized cyanide.

The triarylmethane dyes are highly colored compounds having at least one auxochromic group, such as an amino or hydroxyl group at a position para to the central methane carbon atom. The cyanides of these dyes are colorless, or nearly colorless, but are photosensitive when, in the presence of a suitable activator, they are irradiated with ultra-violet and shorter wave lengths and the original highly colored dye compound is regenerated. This makes these dye cyanides of great value in actionometry and for photographic and photoduplication processes.

The preparation of the cyanides of triarylmethane dyes by treatment of their aqueous solutions with a soluble, ionized cyanide at room temperature is known. However, this method is not always applicable, and has limitations and disadvantages in still other cases. For example, when it is applied to solutions of sulfonated aminotriarylmethane dyes, many of them, such as Xylene Blue AS, Xylene Blue VS, Patent Blue V, Fast Acid Violet 10B, and Erioglaucine, do not react or react so slowly as to make the use of the method impractical for the preparation of their cyanides. Other triarylmethane dyes such as phenolphthalein, for example, are so unreactive that the method cannot be employed for the preparation of their cyanides. On the other hand, if the cyanide solutions are boiled, hydrogen cyanide is lost by hydrolysis and evaporation and the dyes may be partly destroyed by the remaining strong caustic, which decomposes some of them such as Xylene Blue AS, Xylene Blue VS, Patent Blue V, Erioglaucine with hydrolysis of an amino group.

Even where the reaction between the dye and the cyanide takes place rapidly at room temperature it does not always lead to a satisfactory product. The purest grades of commercial soluble, ionized cyanides, such as sodium cyanide and potassium cyanide, contain a few percent of alkali as hydroxide and carbonate and still more alkali is formed by hydrolysis when the cyanide is dissolved in water. Thus the reaction of the dye solution with solutions of commercially available cyanides produces a mixed product in which the desired cyanide is contaminated with the dye carbinol or base. Once it is formed, the base does not react rapidly with alkali cyanides at room temperature and remains even when excess sodium or potassium cyanide is used in the preparation. The base may be readily converted into the dye by treatment with acid, or by simple solution in water if the base is soluble in water.

Therefore, cyanides prepared by this process always have to be purified from the base and dye before they can be used for photographic and photochemical applications. Purification is the most laborious and expensive step in the preparation of useful cyanides. When both the cyanide and the dye are quite soluble in the same solvent, such as water, the separation necessary for the purification of the cyanide may prove extremely difficult. An example of a dye that yields such a soluble cyanide is Light Green SF Yellowish.

In still other cases, the purification necessary to separate the cyanide from its parent dye or its base simultaneously effects an undesirable separation of the cyanide into species. For example, the dyes Acid Fuchsine and Soluble Blue consist of mixtures of species. When their cyanides are used in actionometry it is often desirable to have the colors produced by the action of light possess the same hue as some permanent standard comparison color, most conveniently made from the parent dye; but if the relative proportion of cyanides produced from the parent dye is changed by a purification process, the color formed on irradiation will no longer match the hue of the parent dye.

The new process overcomes these difficulties. It converts the unreactive dyes into cyanides within a short time with good yields and little decomposition. With the more reactive dyes, it gives products which contain much-reduced portions of dye base to contaminate the cyanide.

Accordingly, it is an object of the present invention to provide a process for preparing cyanides of triarylmethane dyes, which are unreactive or only slightly reactive with ionized cyanides, rapidly with high yield and little decomposition.

Another object of the invention is to provide a process for preparing cyanides of maximum purity from triarylmethane dyes of relatively high reactivity but which react with ionized cyanides to yield dye cyanides in admixtures with difficulty separable impurities.

Still another object of the invention is to provide a process for the preparation of the cyanide of a dye which itself is a mixture of compounds so that the dye cyanide is a mixture of the cyanides of these compounds in the same proportion that they exist in the original dye.

Other objects of the invention will be apparent from the following detailed description.

I have found that cyanides of the triarylmethane dyes which are difficulty reactive or form impure, difficult to separate mixtures when treated in solution with ionized, soluble cyanides may readily be prepared by heating a solution of such a triarylmethane dye and an ionized cyanide in a sealed vessel, such as a glass pressure bottle. Under such condition hydrogen cyanide is not lost, yet the unreactive dyes react at the higher temperature and carbinols (dye bases) are also converted into cyanides.

The preferred solvent for the preparation of the solution of triarylethane dye and ionized cyanide is water. However, it should be understood that any solvent in which both the dye and cyanide are reasonably soluble and in which the soluble cyanide is ionizable may be employed in the process. As examples of such solvents, there may be mentioned the lower aliphatic alcohols, methyl, ethyl and propyl alcohols.

Any soluble, ionizable cyanide may be employed in the process, but sodium and potassium cyanide are preferred because they are available commercially in a sufficiently pure state that they can be employed directly in the process.

The concentration and relative proportions of the reactants is not critical. In general, I prefer to employ an aqueous solution containing 1 to 25% by weight of the triphenyl methane dye and soluble cyanide in the proportion to supply 1.5 to 14 mols of cyanide ion per mol of dye.

The temperature of the reaction medium, also, is not critical and will necessarily vary with the reactivity of the dye employed. In general, the temperature should be such that reaction is complete in from 1 to 4 hours.

For most reactions a temperature of approximately 100° C. has been found satisfactory and this temperature is preferred because it can easily be obtained and controlled by immersing the reaction vessel in boiling water. The immersion of the sealed vessel in water, particularly if it is a glass bottle, has the added advantage that if it should explode and shatter the surrounding water will prevent pieces of glass wet with the very poisonous cyanide solution from flying through the air and cutting any person in the vicinity of the explosion.

The pressure conditions will be proportional to the temperature since the reaction is carried out in a sealed vessel. At the preferred temperature of 100° C., the maximum pressure will, of course, be two atmospheres.

The manner in which the reaction product, the triarylmethane dye cyanide, is isolated from the reaction medium will depend on its solubility therein. If the dye cyanide is relatively insoluble in the reaction medium, it may be crystallized, particularly by cooling the reaction medium to room temperature or below, and the crystallized dye cyanide separated by filtration or other suitable means.

If the dye cyanide is relatively soluble in the reaction medium so that crystallization is not practical, it may be isolated by adding a mineral acid such as sulfuric acid or hydrochloric acid to remove excess cyanide ions as hydrogen cyanide, being careful to carry out this step under a good hood. The remaining solution may then be evaporated to yield a mixture of the dye cyanide and the salt of the cation of the soluble, ionizable cyanide and the anion of the mineral acid employed. This mixture of dye cyanide and salt is suitable for many purposes but the dye cyanide may be separated by treating the mixture, before or after evaporation, with an organic solvent such as i-propyl alcohol in which the dye cyanide is soluble but the inorganic salt is insoluble to extract the dye cyanide which then can be isolated by evaporation of the solvent.

When the dye cyanide is soluble in the reaction medium, impurities may be removed prior to its evaporation. If the impurities are insoluble this may be accomplished by filtration, if soluble, by the addition of an adsorbent such as finely divided charcoal.

If the dye cyanide is sulfonated and is produced in a soluble form as the result of the reaction, it is possible that this form may be converted to a salt which is sufficiently insoluble that it will crystallize. The strontium and barium salts have been found suitable for this purpose in some instances.

The following examples are set forth as illustrating, but not as limiting, the invention and it is to be understood that the operations described are carried out by yellow light, such as the illumination from a Kodak OA Safelight.

*Example 1.—Xylene Blue VS cyanide*

To a solution of 25 g. of commercial Xylene Blue VS, Colour Index No. 672, in 150 ml. of water is added 4.5 g. of 95% sodium cyanide and the mixture is heated in a pressure bottle for 1 hour. Suitable precautions should be taken to avoid cuts by glass wet with sodium cyanide solution in the event of the explosion of the bottle. The solution is then cooled, allowed to stand for 1 day at 25° C. and filtered from the precipitated Xylene Blue VS cyanide disodium salt having the formula

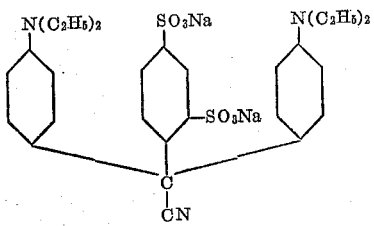

The disodium salt is readily soluble in water to yield a colorless solution that slowly becomes blue on exposure to radiation of wave length 2537 A. The color change is much slower than with a solution of a representative basic dye cyanide, such as malachite green cyanide in alcohol, and thus is useful in the actinometry of more intense radiation.

The free acid form of Xylene Blue VS cyanide, having the formula

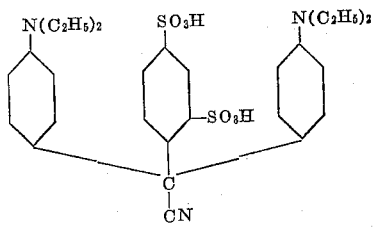

may be prepared by treatment of a solution of 11 g. of the disodium salt in 100 ml. of water with 11.2 ml. of concentrated hydrochloric acid. After the mixture has stood at room temperature for 2 days, the colorless precipitated free acid is collected on a filter, washed with water, and air dried. It is sparingly soluble in water. A dilute, colorless, aqueous solution of the free acid colors blue on ultra-violet irradiation at a speed intermediate between that of the solutions of the sodium salt and of alcoholic solutions of malachite green cyanide.

The barium salt of Xylene Blue VS cyanide having the formula

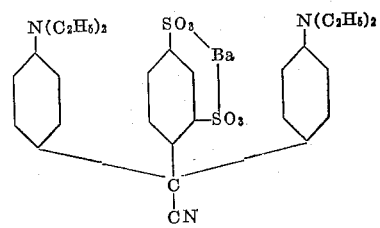

may be prepared by neutralization of a hot ½ of 1% aqueous solution of the free acid to pH 8.4 with N/10 barium hydroxide solution. The neutralized solution is cooled to room temperature, allowed to stand for 3 days, and filtered from the colorless, crystalline barium salt. The barium salt is less soluble in water than the free acid, but quite sufficiently soluble to give photosensitive solutions that behave on exposure to ultra-violet like solutions of the sodium salt.

*Example 2.—Xylene Blue AS cyanide*

A solution of 25 g. of Xylene Blue AS, Colour Index No. 673, in 150 ml. of water at 85° C. is treated in a pressure bottle with 9 g. of 95% sodium cyanide, the pressure bottle immediately sealed and heated in a boiling water bath for 1 hour. The bottle is then cooled, allowed to stand over night at 25° C., and the precipitated, colorless disodium salt of the dye cyanide having the formula

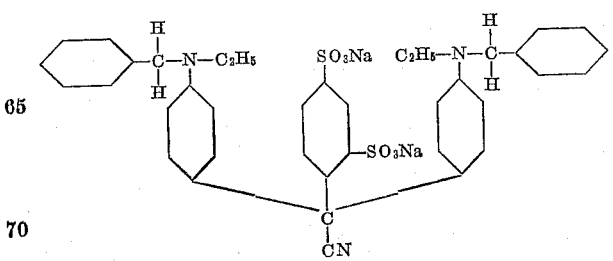

is collected on a filter and air dried. This salt is readily soluble in water to give colorless solutions that color slowly when exposed to ultra-violet.

The free acid form of the dye cyanide having the formula

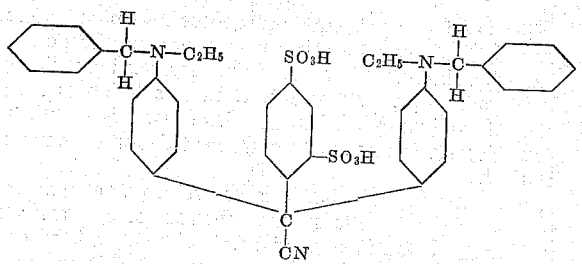

may be prepared by treatment of a solution of 15 g. of the disodium salt in 400 ml. of water with 22.5 ml. of 2 N hydrochloric acid. After standing for 7 days at room temperature the precipitated free acid is collected on a filter, washed with water and air dried. The colorless crystals are sparingly soluble in water to give a solution that colors on ultra-violet irradiation somewhat more rapidly than solutions of the disodium salt.

The barium salt, having the formula

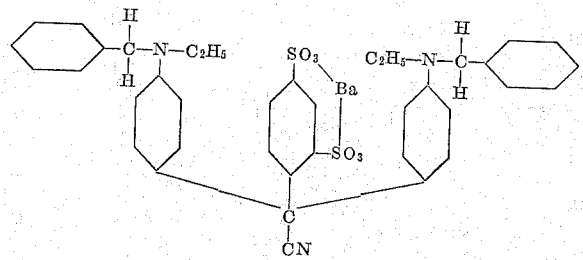

is readily prepared by neutralization of a boiling solution of the free acid in 1,000 times its weight of water with N/10 barium hydroxide to pH 8.0. The colorless, crystalline barium salt is little soluble in water, but sufficiently soluble to give a photosensitive solution with properties similar to that of the disodium salt.

Example 3.—Patent Blue V cyanide

To a solution of 5 g. of Patent Blue V, Colour Index No. 712, of 35% dye content, in 75 ml. of water is added 2 g. of 95% sodium cyanide, and the mixture heated in a pressure bottle in a boiling water bath for 1 hour. The solution is then cooled to 25° C., filtered from a trace of tar and saturated with carbon dioxide to produce the disodium salt having the formula

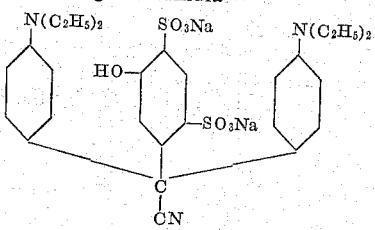

from the trisodium salt having the formula

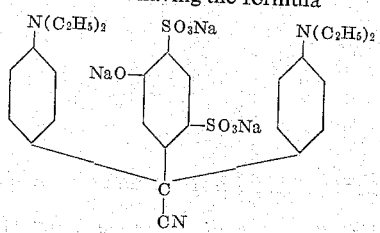

When the solution has been saturated at 25° C. and atmospheric pressure with carbon dioxide, it is treated with 40 ml. of a 49% aqueous solution of sodium acetate trihydrate, allowed to stand for 3 days and the disodium salt collected on a filter and washed with 91% isopropyl alcohol (25 ml.) and air dried.

The salt forms colorless solutions in water that slowly becomes blue on exposure to ultra-violet. The salt may be converted into the free acid having the formula

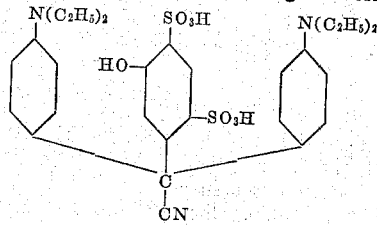

and other salts as with the Xylene Blue cyanides described in Examples 1 and 2.

Example 4.—Fast Acid Violet 10B cyanide

A solution of 25 g. of commercial Fast Acid Violet 10B in the form of Kiton Fast Violet 10B (manufactured by the Ciba Company) in 150 ml. of water heated to 90° C. is placed in a glass pressure bottle. To the bottle is added a solution of 2 g. of 95% sodium cyanide in 10 ml. of water. The bottle is sealed and heated at 100° C. for 3 hours. It is transferred to a dark place, allowed to cool and to stand at 25° C. for 24 hours. The bottle is then opened, the precipitate collected on a filter and dried without washing. This precipitate is the disodium salt having the formula

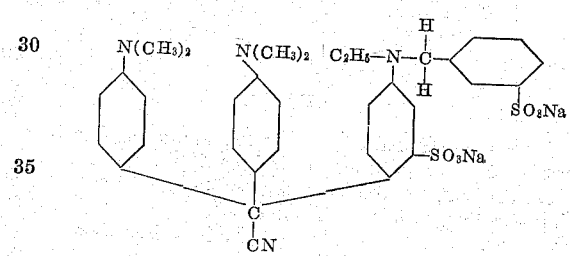

It is soluble in water to form a solution that colors violet on exposure to radiation of wave lengths shorter than about 3250 A.

The free acid having the formula

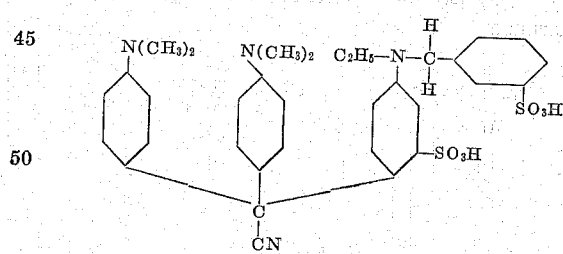

is obtained by treating a solution of 5 g. of the disodium salt in 70 ml. of water at 50° C. with 6.5 ml. of 2 N hydrochloric acid. The resulting solution is allowed to stand in the dark at room temperature for 4 days, the precipitate collected on a filter, washed with 20 ml. of cold water, and dried in the dark. The free acid so obtained is stable in the light and is pure enough for most purposes. To obtain it analytically pure it should be recrystallized from 500 times its weight of water. An aqueous solution of the free acid is colored violet by exposure to wave lengths shorter than about 3650 A.

Example 5.—Acid Fuchsine cyanide

A solution of 5 g. of Acid Fuchsine, National Aniline Certified Biological Stain, 64% dye content, in 50 ml. of water is treated with 1 g. of 95% sodium cyanide and the solution sealed in a pressure bottle and heated at 100° C. for 1 hour. The bottle is then cooled, opened, and the brown solution filtered from a slight impurity. The filtrate is boiled with activated charcoal which removes the brown color, and filtered. In a good hood the filtrate is made just acid with 64% sulfuric acid and evaporated to dryness in vacuo at 30° C. The resulting hygroscopic mixture of Acid Fuchsine cyanide and sodium sulfate is satisfactory for many purposes. It may be further purified by extraction of the dye cyanide with boiling 91% i-propyl alcohol and evaporation of the alcohol.

Example 6.—Light Green SF Yellowish cyanide

A solution of 5 g. of Colour Index No. 670 (National Aniline Light Green SF Yellowish Biological Stain) in 75 ml. of water is put in a pressure bottle with 1 g. of 96% sodium cyanide, the bottle sealed and heated at 100° C. for 1 hour in the dark. After heating, the bottle is cooled, allowed to stand overnight, and opened. The solution is made just acid with 64% sulfuric acid added drop by drop to the first acid reaction: This added drop by drop is carried out in a good hood because hydrogen cyanide is evolved. The solution is then evaporated at 25-30° C. in vacuo to dryness, leaving an opaque, tarry or glassy mixture of sodium sulfate and the sodium salt of the new compound which has the formula

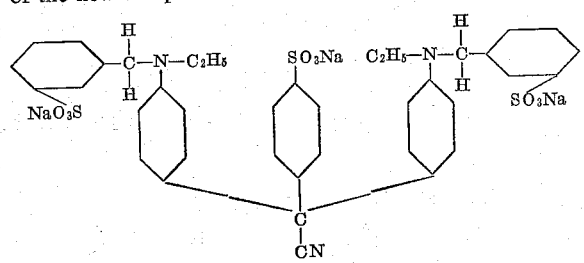

The dye cyanide is extracted from the sodium sulfate by successive 50 ml. portions of boiling i-propyl alcohol. The extracts are combined and evaporated to dryness, leaving the dye cyanide sodium salt as a clear hygroscopic glass. It is extremely soluble in water to form strongly photosensitive solutions.

Example 7.—Light Green SF Bluish cyanide

The same procedure used in Example 6 is applied to Colour Index No. 669 to produce the compound having the formula

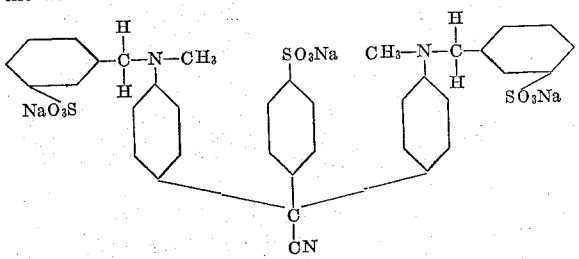

Example 8.—Soluble Blue cyanide

A solution of 5 g. of National Aniline "Aniline Blue" Certified Biological Stain in 75 ml. of boiling water is placed in a pressure bottle with 1 g. of 95% sodium cyanide, the bottle sealed and heated to 100° C. for 1 hour in the dark. After heating, the bottle is cooled, opened and the solution filtered from a trace of tar. The filtrate is made just acid in a good hood with 64% sulfuric acid and evaporated to dryness in vacuo at 30° C. The residue is dissolved in 50 ml. of water and shaken with 100 ml. of i-propyl alcohol, whereupon two layers are formed and separate on standing. The upper alcoholic layer is decanted, the lower aqueous layer extracted with two 20 ml. portions of i-propyl alcohol which are added to the first alcoholic layer. The alcoholic extract is then evaporated to dryness, leaving the salt of the dye cyanide as an amorphous glassy material. This is readily soluble in water to form a photosensitive solution which turns blue on exposure to radiation of wave lengths shorter than 3300 A.

Example 9.—Erioglaucine cyanide

Twenty-five g. of Kiton Pure Blue L (manufactured by the Ciba Company) is put in a pressure bottle with 150 ml. of boiling water. The dye dissolves immediately. The solution is cooled to 80° C. and a solution of 3.4 g. of 95% sodium cyanide in 10 ml. of water is added, the bottle sealed immediately and heated for 1 hour at 100° C.

After heating, the bottle is cooled to room temperature, opened, and the solution filtered from a trace of impurity, treated in a good hood with 6.5 ml. of concentrated hydrochloric acid and evaporated in vacuo at about 50° C. to a volume of 60 ml. The acidity of the somewhat viscous solution is adjusted with sodium hydroxide to pH 6.8. A solution of 22 g. of potassium chloride in 75 ml. of boiling water is then added and the resulting solution allowed to stand in the dark for a week with occasional stirring and scraping of the vessel walls to accelerate the very slow crystallization of the potassium salt which has the formula

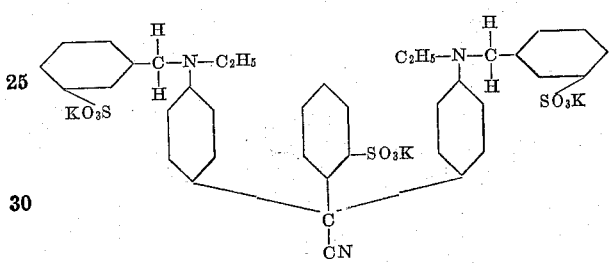

The precipitate is collected on a filter, washed with 25 ml. of aqueous 10% potassium chloride solution, sucked as dry as possible on the filter and dried in vacuo over sulfuric acid. The yield is about 15 g. of nearly colorless material. A second crop, though containing more dye, may be obtained by the addition of 22 g. more of potassium chloride to the mother liquor.

The potassium salt is very soluble in water to form a photosensitive solution that turns blue on exposure to ultra-violet.

A less soluble salt that can be recrystallized from water without the necessity of salting out may be made by treatment of a solution of 15 g. of the potassium salt in 100 ml. of water with 26 ml. of molar strontium chloride solution and allowing the solution to stand for 1 month with occasional stirring and scratching of the walls of the vessel. The precipitate is then collected and dried in a vacuum desiccator over sulfuric acid. It has the approximate composition represented by the formula

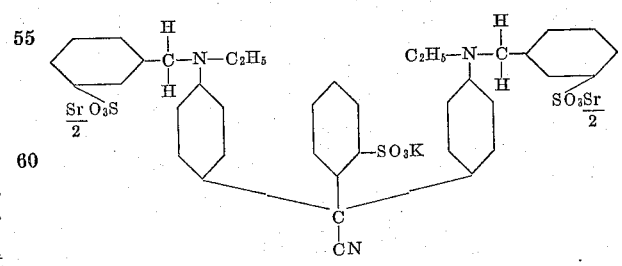

It may be recrystallized from 15 times its weight of water.

Example 10.—Phenolphthalein cyanide

Ten g. of powdered phenolphthalein was mixed with a solution of 2.3 g. of sodium cyanide in 125 ml. of water and vigorously stirred at 23° C. for six hours but more than 8 g. of phenolphthalein was still undissolved and was recovered with unchanged melting point. The deep red color of the solution showed that the phenolphthalein that had dissolved as the sodium salt had not reacted to form phenolphthalein cyanide,

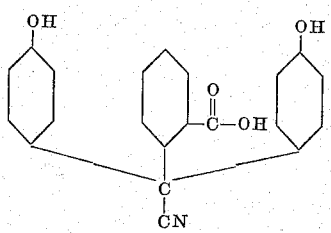

However, phenolyphthalein cyanide was readily prepared as follows: A mixture of 7 g. of phenolphthalein, 14 g. of 95% sodium cyanide and 70 ml. of water are heated together in a sealed bottle at 100° C. for 1 hour. The resulting brown solution is diluted with 75 ml. of water, cooled, filtered from a little tarry material, which is discarded, and the filtrate acidified with 30 ml. of concentrated hydrochloric acid. The precipitated phenolphthalein cyanide is collected, washed with water and dried at 110° C. It is colorless and crystalline. Its solution in N/10 sodium hydroxide is colorless, but on exposure to ultra-violet it becomes a deep pink.

I claim:

1. A process for preparing a cyanide of a triphenylmethane dye having a member selected from the class consisting of —$SO_3X$ and —$CO_2X$ attached to a phenyl nucleus in a position ortho to the central methane carbon atom, X being a cation, comprising: confining a solution of said dye and an alkali metal cyanide in a sealed vessel, heating said solution to react said cyanide with said dye to form the cyanide of said dye wherein the nitrile group is attached to the central methane carbon atom, and separating said dye cyanide from the reaction mixture.

2. The process of claim 1 in which said solution is an aqueous solution.

3. The process of claim 2 in which said cyanide is sodium cyanide.

4. The process of claim 2 in which said cyanide is potassium cyanide.

5. The process of claim 2 in which said aqueous solution is heated to approximately 100° C.

6. The process of claim 2 in which said dye comprises 1 to 25% by weight of said solution and said cyanide is present in the proportion to supply 1.5 to 14 mols of cyanide ion to 1 mol of said dye.

7. The process of claim 5 in which said dye comprises 1 to 25% by weight of said solution and said cyanide is present in the proportion to supply 1.5 to 14 mols to 1 mol of said dye.

8. The process of claim 2 in which said triphenylmethane dye is a sulfonated aminotriphenylmethane dye.

9. The process of claim 2 in which said triphenylmethane dye is phenolphthalein.

10. The process of claim 2 in which said triphenylmethane dye is Xylene Blue VS, Colour Index No. 672.

11. The process of claim 2 in which said triphenylmethane dye is Xylene Blue AS, Colour Index No. 673.

12. The process of claim 2 in which said triphenylmethane dye is Patent Blue V, Colour Index No. 712.

13. The process of claim 2 in which said triphenylmethane dye is Fast Acid Violet 10B, Colour Index No. 696.

References Cited in the file of this patent

UNITED STATES PATENTS 2,315,661    Salzer et al. _____ Apr. 6, 1943

OTHER REFERENCES

Sidgwick's Organic Chemistry of Nitrogen, Taylor and Baker, 1949, pages 84 and 90.